US012784157B2

(12) United States Patent
Yoon et al.

(10) Patent No.: US 12,784,157 B2
(45) Date of Patent: Nov. 3, 2026

(54) SYSTEMS AND METHODS FOR DIVERSE IMAGE INPAINTING

(71) Applicant: Datum Point Labs Inc., Jackson, WY (US)

(72) Inventors: Dongsik Yoon, Seoul (KR); Jeong-Gi Kwak, Seoul (KR); Hanseok Ko, Seoul (KR)

( * ) Notice: Subject to any disclaimer, the term of this patent is extended or adjusted under 35 U.S.C. 154(b) by 200 days.

(21) Appl. No.: 18/625,052

(22) Filed: Apr. 2, 2024

(65) Prior Publication Data

US 2024/0338802 A1 Oct. 10, 2024

Related U.S. Application Data

(60) Provisional application No. 63/457,659, filed on Apr. 6, 2023.

(51) Int. Cl.
*G06T 5/77* (2024.01)
*G06N 3/0455* (2023.01)
*G06T 5/50* (2006.01)

(52) U.S. Cl.
CPC ............ *G06T 5/77* (2024.01); *G06N 3/0455* (2023.01); *G06T 5/50* (2013.01); *G06T 2207/20081* (2013.01); *G06T 2207/20084* (2013.01)

(58) Field of Classification Search
CPC ... G06T 5/77; G06T 5/50; G06T 2207/20081; G06T 2207/20084; G06T 5/60; G06N 3/0455; G06N 3/045; G06N 3/084
See application file for complete search history.

(56) References Cited

U.S. PATENT DOCUMENTS

2024/0096072 A1* 3/2024 He ........................ G06V 10/26

OTHER PUBLICATIONS

Elad Richardson, Yuval Alaluf, Or Patashnik, Yotam Nitzan, Yaniv Azar, Stav Shapiro, and Daniel Cohen-Or, "Encoding in style: a stylegan encoder for image-to-image translation," in CVPR, 2021.
Tao Yu, Zongyu Guo, Xin Jin, Shilin Wu, Zhibo Chen, Weiping Li, Zhizheng Zhang, and Sen Liu, "Region normalization for image inpainting," in AAAI, 2020, pp. 12733-12740.
Taesung Park, Ming-Yu Liu, Ting-ChunWang, and Jun-Yan Zhu, "Semantic image synthesis with spatially-adaptive normalization," in CVPR, 2019.
Tero Karras, Samuli Laine, and Timo Aila, "A style-based generator architecture for generative adversarial networks," in CVPR, 2019.
Tero Karras, Samuli Laine, Miika Aittala, Janne Hellsten, Jaakko Lehtinen, and Timo Aila, "Analyzing and improving the image quality of stylegan," in CVPR, 2020.

* cited by examiner

*Primary Examiner* — Jonathan A Boyd
(74) *Attorney, Agent, or Firm* — The Rapacke Law Group, P.A.

(57) ABSTRACT

Embodiments described herein provide systems and methods for image inpainting. A system receives a masked input image and a mask. The system generates, via a pretrained model, a first pass inpainted image based on the masked input image. The system generates a plurality of variants of the first pass inpainted image. The system generates, via a first encoder, a vector representation of the masked input image. The system generates, via a first decoder, a plurality of output images based on the vector representation of the masked input image and conditioned by the plurality of variants of the first pass inpainted image.

17 Claims, 12 Drawing Sheets

| | Mask | Ours | LBAM | EC | MLGN |
|---|---|---|---|---|---|
| SSIM | Quickdraw | **0.833** | 0.821 | 0.817 | 0.832 |
| | 10-20% | 0.837 | 0.814 | 0.827 | **0.839** |
| | 20-30% | **0.777** | 0.744 | 0.761 | **0.777** |
| | 30-40% | **0.709** | 0.667 | 0.681 | 0.706 |
| | 40-50% | **0.633** | 0.583 | 0.595 | 0.624 |
| LPIPS | Quickdraw | 0.049 | **0.047** | **0.047** | 0.063 |
| | 10-20% | 0.052 | 0.057 | **0.051** | 0.065 |
| | 20-30% | 0.084 | 0.087 | **0.082** | 0.103 |
| | 30-40% | **0.124** | 0.126 | 0.128 | 0.148 |
| | 40-50% | **0.170** | 0.172 | 0.183 | 0.201 |
| FID | Quickdraw | 25.95 | **25.79** | 27.49 | 28.45 |
| | 10-20% | **24.74** | 27.63 | 25.65 | 26.73 |
| | 20-30% | **34.55** | 36.51 | 34.80 | 38.34 |
| | 30-40% | **46.87** | 48.47 | 47.14 | 52.54 |
| | 40-50% | 64.86 | 64.40 | **63.75** | 73.07 |

FIG. 11

| | Mask | PIC | Ours |
|---|---|---|---|
| Diversity (LPIPS) ↑ | 20-30% | 0.0714 | **0.0849** |
| | 30-40% | 0.1079 | **0.1313** |

FIG. 12

| | SPADE | w/o RN | Ours |
|---|---|---|---|
| SSIM | 0.816 | 0.817 | **0.833** |
| LPIPS | 0.056 | 0.057 | **0.049** |
| FID | 27.96 | 28.45 | **25.95** |

FIG. 13

SYSTEMS AND METHODS FOR DIVERSE IMAGE INPAINTING

CROSS REFERENCE(S)

The instant application is a nonprovisional of and claim priority under 35 U.S.C. 119 to U.S. provisional application No. 63/457,659, filed Apr. 6, 2023, which is hereby expressly incorporated by reference herein in its entirety.

TECHNICAL FIELD

The embodiments relate generally to systems and methods for image inpainting.

BACKGROUND

Image inpainting is a problem in computer vision that restores occluded regions and completes damaged images. Among the existing approaches are those that propagate small patches from the background area to the missing regions using similarity. However, unlike natural or landscape image inpainting, some images, such as facial images, have unique parts that cannot be produces by copying other areas of the image such as nose or mouth. Further, existing methods generate only one result for each masked image, even though there are other reasonable possibilities (for example, may different plausible facial features exist for an image with an occluded face). Therefore, there is a need for improved systems and methods for diverse image inpainting.

BRIEF DESCRIPTION OF THE DRAWINGS

FIGS. 10A-13 provide charts illustrating exemplary performance of different embodiments described herein.

DETAILED DESCRIPTION

Image inpainting is a problem in computer vision that restores occluded regions and completes damaged images. Among the existing approaches are those that propagate small patches from the background area to the missing regions using similarity. However, unlike natural or landscape image inpainting, some images, such as facial images, have unique parts that cannot be produces by copying other areas of the image such as nose or mouth. Further, existing methods generate only one result for each masked image, even though there are other reasonable possibilities (for example, may different plausible facial features exist for an image with an occluded face). To prevent any potential biases and unnatural constraints stemming from generating only one image, embodiments herein describe a framework for diverse image inpainting. While examples described herein refer to facial images, the systems and methods described may be applied to other types of images that may have occluded portions that have a number of different possibilities.

The framework described herein performs diverse image inpainting based on controlling the latent space of an image generation model (e.g., StyleGAN) to generate a set of plausible inpainted regions while maintaining the remaining regions. The approach only requires an image with a masked region as input. The framework first coarsely completes the input (masked) image from the pre-trained inpainting network so that and encoder (e.g., a pSp encoder) will extract style vectors in the latent space. Afterward, the latent space is manipulated in meaningful directions to transform the semantic attributes of the decoded images. By feeding the manipulated latent space into the image generation model (e.g., a StyleGAN decoder), images may be generated with transformed facial shapes or attributes. Additionally, decoded images may be fed as a condition into a spatially adaptive region normalization (SPARN) decoder.

The SPARN decoder described herein adopts region normalization in each layer to allow synthesizing realistic inpainting results. Thus, the generator can be trained to perform more diverse image inpainting without any prior condition. Embodiments described herein provide a number of benefits. For example, as demonstrated in FIGS. 10A-13, embodiments described herein outperform several alternative methods. Additional benefits of methods are described herein with respect to the associated features.

Figure 1:
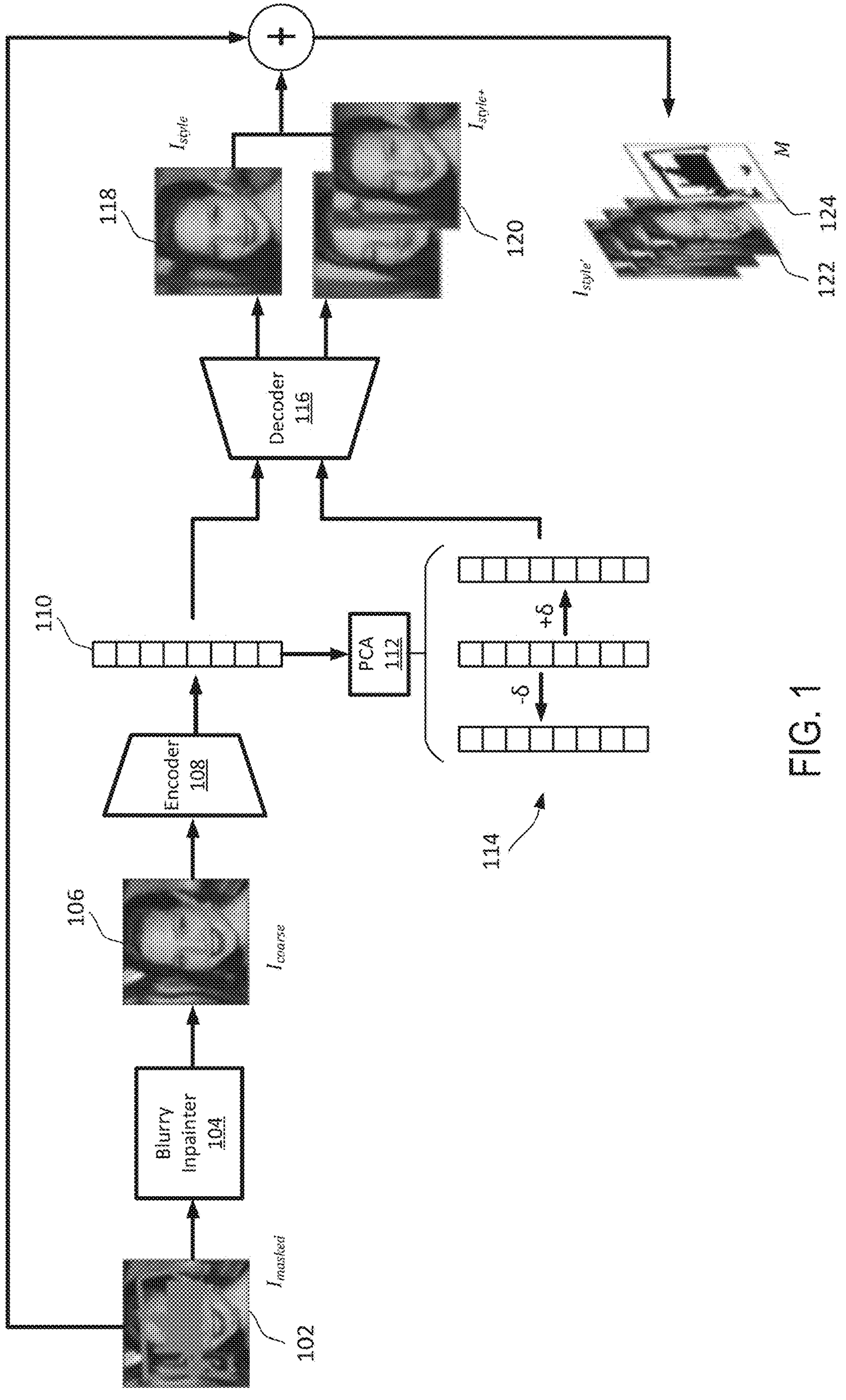
FIGS. 1-2 illustrate a framework for diverse image inpainting, according to some embodiments.

FIG. 1 illustrates an exemplary framework for diverse image inpainting, according to some embodiments. As shown in FIG. 1 and continued in FIG. 2, the framework consists of four parts: a pre-trained inpainting network (blurry inpainter 104), an encoder 108, a decoder 116, and the generator (encoder 202 and decoder 204). A customized pre-trained inpainting network (blurry inpainter 104) is applied for coarse inpainting. In some embodiments, blurry inpainted 104 is a customized MLGN model that is adapted to generate blurrier images, where MLGN is as described in Liu et al., Facial image inpainting using multi-level generative network. In some embodiments, an MLGN model is customized from the original model by an adjustment made to the lambda parameter for synthesizing blurry results. The blurry results promote more diverse embeddings by encoder 108, thereby allowing decoder 116 to generate more diverse image inpainting.

In some embodiments, encoder 108 is a pSp encoder as described in Richardson et al., Encoding in style: a stylegan encoder for image-to-image translation, CVPR, 2021. In some embodiments, decoder 116 is a StyleGAN decoder as described in Karras et al, Analyzing and improving the image quality of StyleGAN, CVPR, 2020. Ground truth and masked image pairs may be generated as:

$$I_{masked} = I_{gt} \odot M \tag{1}$$

where $I_{gt}$ is the ground truth image, M is the mask applied to erase portions of the ground truth image, and $I_{masked}$ is the masked image. $I_{masked}$ may be into a pre-trained customized MLGN (or another suitable encoder 108) as $$I_{coarse} = cMLGN(I_{masked}) \quad (2)$$

Most image inpainting methods generate only one result for each masked image, even though there are many other possibilities. As such, there are always possibilities of unrealistic biases and constraints due to the network being forced to produce only one of many plausible results. To prevent such artificial biases, the framework uses image augmentation that is capable of synthesizing a variety of images that have a similar structure as the ground truth but with changed facial attributes. $I_{coarse}$ (image 106) is applied to encoder 108 which maps the embedding vector w in a latent space W+. The extracted w is then decoded to produce an initial set of diverse images using decoder 116.

A principal component analysis (PCA) based algorithm 112 may be used to discover principal components that span dominant changes in decoded images. For example, in some embodiments, PCA 112 is a SeFa algorithm as described in Shen et al, Closed-form factorization of latent semantics in GANs, CVPR, 2021. In some embodiments, PCA 112 performs eigen-decomposition of the weight matrix of decoder 116 to discover principal components that span dominant changes in the decoded images. the embeddings $\omega_{\delta_i}$, may be perturbed by $\delta_i$ in a number of principal directions to produce multiple embeddings 114. Embeddings 114 may be decoded by decoder 116 to generate images. The image that is the decoded image of the unmodified vector 110 is $I_{style}$ image 118. The images based on the modified vectors 114 are $I_{style+}$ images 120. These may be represented as:

$$I_{style} = StyleGAN(pSp(I_{coarse})) \quad (3)$$

$$I_{style+} = \{StyleGAN(\omega_{\delta_i}), \ldots, StyleGAN(\omega_{\delta_\alpha})\}$$

The $I_{style+}$ images 120 and $I_{style}$ image 118 may be used to fill in only the masked portion of $I_{masked}$ 102, such that the unmasked portions of $I_{masked}$ 102 remain unchanged. The result of this combination may be defined as $I_{style'}$ which may be represented as:

$$I_{style'} = I_{masked} + M_r \odot \{I_{style}, I_{style+}\} \quad (4)$$

where, $M_r$ is the reversed mask (i.e., the inverse of mask 124). Mask 124 is the mask associated with the masked image 102. Mask 124 is illustrated together with the full style image set 122 since it may also be used as an input to the decoder as described in FIG. 2.

Figure 2:
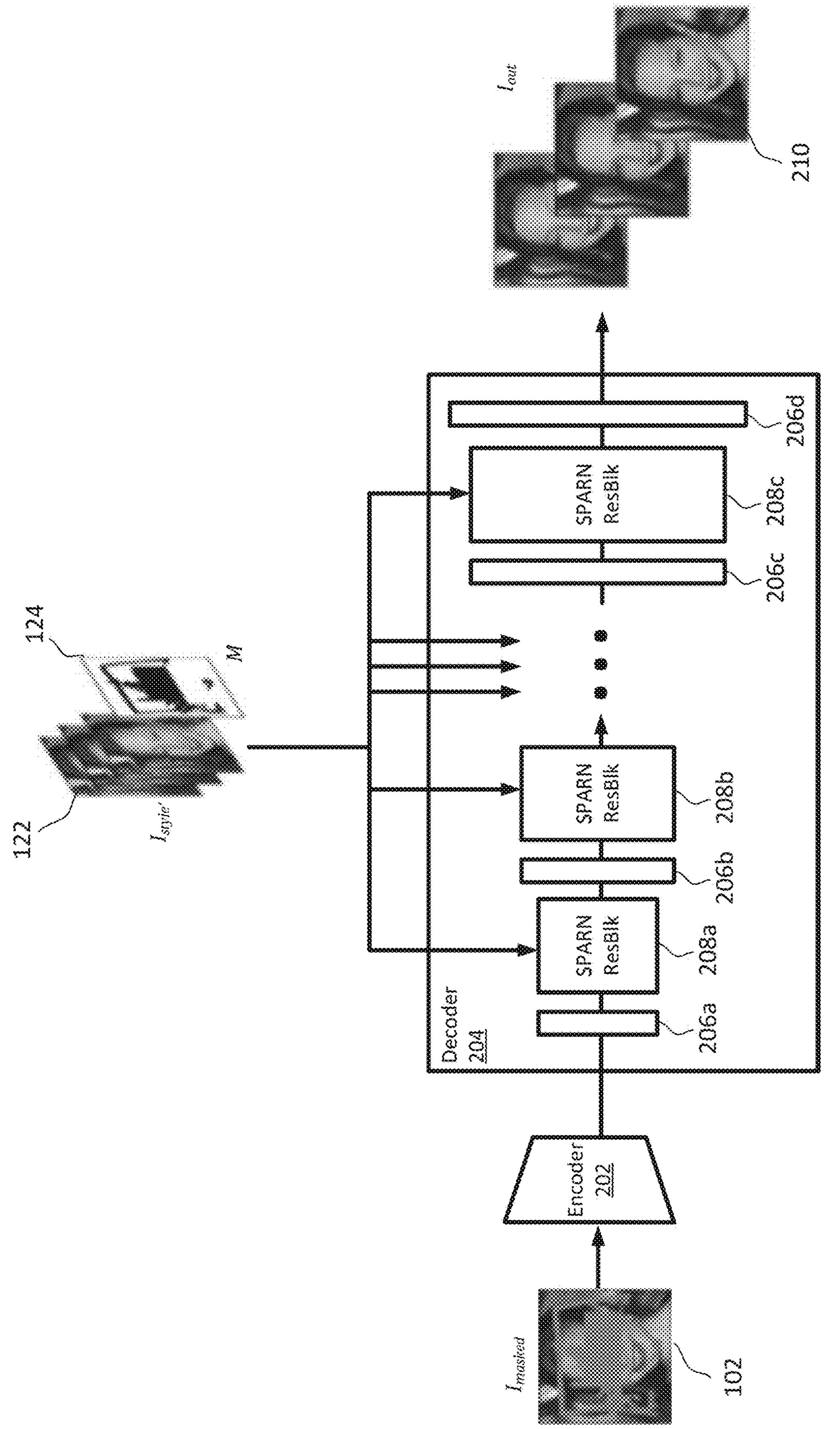

FIG. 2 illustrates the decoding portion of the diverse image inpainting framework discussed in FIG. 1. The generator G(•) is comprised of an encoder 202 and a "SPARN" decoder 204. In some embodiments, encoder 202 is a SPADE encoder as described in Park et al., Semantic image synthesis with spatially-adaptive normalization, CVPR, 2019. SPARN decoder 204 can maintain consistency in the masked and unmasked regions by using region normalization for image inpainting.

Additionally, $I_{masked}$ the masked input image 102 may be input into encoder 202 to ensure that features present in the masked image are maintained in the output images. SPARN decoder 204 consists of SPARN residual blocks 208 and upsampling layers 206. In the illustrated example, there are SPARN residual blocks (SPARN ResBlks) 208*a*-208*c* and upsampling layers 206*a*-206*d*. In some embodiments, more or fewer residual blocks 208 and/or upsampling layers 206 may be used. Since each residual block 208 runs at a different scale, the input M and $I_{style'}$ may be downsampled to match the spatial resolution at each respective residual block 208 to which they are input. Thereby, more diverse facial image inpainting may be performed using as conditions various images that transformed several facial attribute details. The output images $I_{out}$ 210 of decoder 204 may be represented as $$I_{out} = G(I_{masked}, I_{style'}, M) \quad (5)$$

Output images $I_{out}$ 210 maintain the non-masked portions of input masked image 102, while providing diverse options for in-filling the masked portions. In some embodiments, multiple output images Iout 210 may be generated by repeatedly decoding via decoder 204 with each instance of decoder 204 utilizing a different image from $I_{style'}$ 122 together with mask 124. In other embodiments, each image of $I_{style'}$ is applied together to a single instance of decoder 204 as different channels.

Figure 3:
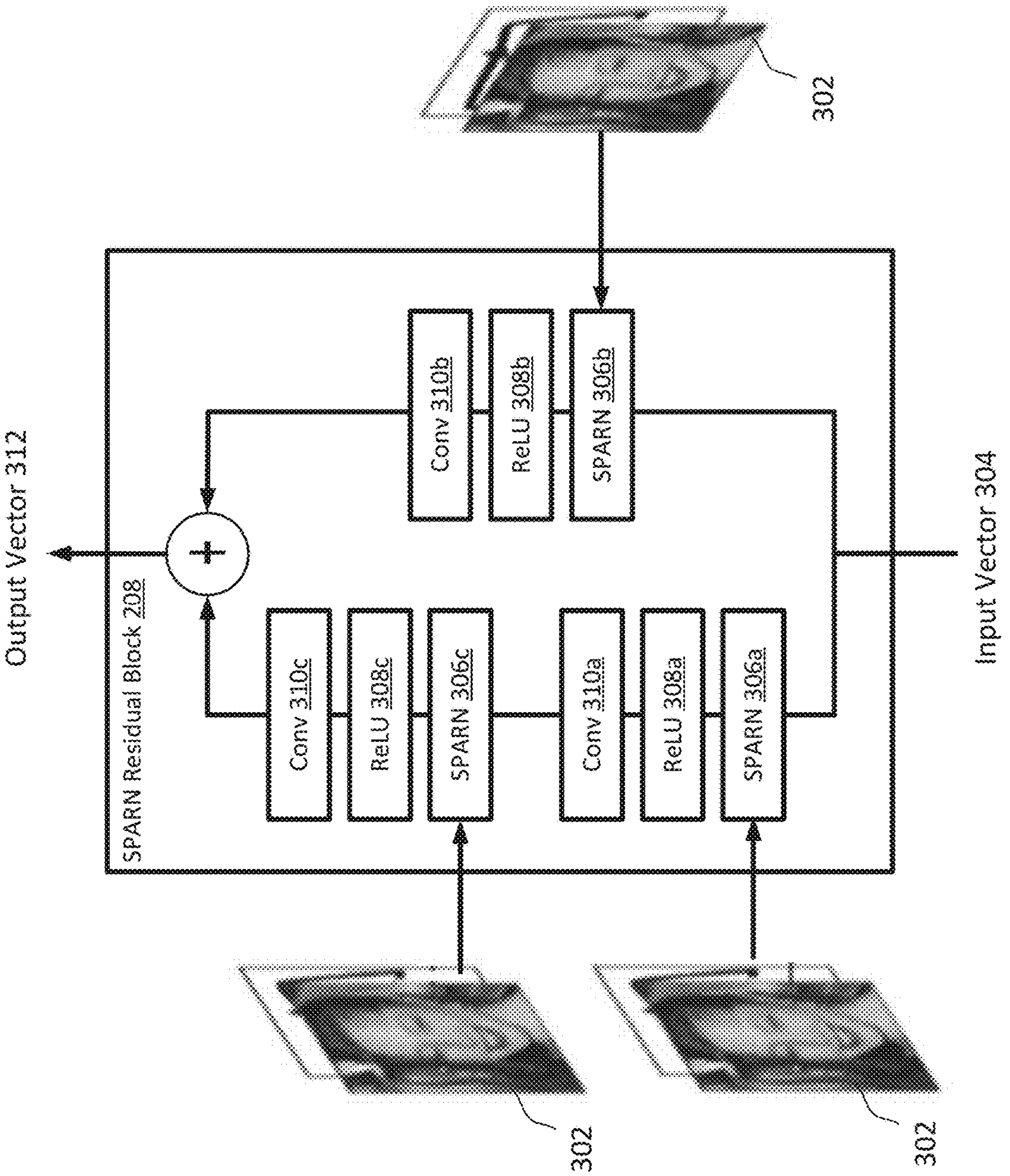
FIG. 3 illustrates a simplified diagram of an exemplary SPARN residual block, according to some embodiments.

FIG. 3 illustrates a simplified diagram of an exemplary SPARN residual block (ResBlk) 208, according to some embodiments. As illustrated, SPARN residual block 208 includes a number of SPARN layers 306, ReLU layers 308, and convolution layers 310. These layers as illustrated transform an input vector 304 to an output vector 312 in such a way that the style of the image represented by output vector 312 is based on the style of the images 302 that are used to condition the SPARN layers 306. In some embodiments, images 302 are images 122 and may include mask 124. In some embodiments, instead of SPARN layer 306*b*, ReLU layer 308*b*, and convolution layer 310*b*, a direct skip connection is provided that sums input vector 304 to the output of convolution 310*c*.

As illustrated, each SPARN layer 306 is conditioned by images 302. Each SPARN layer 306 may perform a style transfer technique that applies or partially applies the style of images 302 to the input of the respective SPARN layer 306. For example, each SPARN layer 306 may perform conditional normalization, in which scale and offset parameters derived from images 302 are applied to the respective input vector. For example, in some embodiments, each SPARN layer 306 performs region normalization (RN). Region normalization may normalize spatial regions on each channel of an input vector independently. The different regions may be defined by the mask (e.g., mask 124) such that the masked region is normalized and the unmasked region is normalized, then those independently normalized regions may be recombined to form the output. In some embodiments, region normalization is applied as described in Yu et al., Region Normalization for Image Inpainting, AAAI, 2020. In some embodiments, each SPARN layer 306 applies region normalization to the input, and then multiplies the region normalized vector/feature map with a scaling feature map (γ) and sums with an offset feature map (β). The scaling and offset feature maps may be computed by convolutions with the input, where the parameters of the convolutions may be learnable parameters.

Returning to the discussion of FIG. 2, the repeated application of SPARN residual blocks 208 at different spatial resolutions transfers the style of each image of $I_{style'}$ 122 to the respective output images 210, effectively inpainting the produce semantically diverse output images 210.

The framework described in FIGS. 1-3 may be trained by updating parameters of one or more components via back-propagation according to a loss function. For example, parameters of encoder 102, decoder 116, encoder 202, and decoder 204 including up-sampling blocks 206, and/or SPARN residual blocks 208 may be updated. In some embodiments, parameters of the framework are fixed (after pre-training of those components) except for the encoder 202 and decoder 204.

In order to synthesize plausible and realistic image inpainting, a loss function may be defined in two parts: inpainting loss and adversarial loss. During training, output images 210 $I_{out}$ and a ground truth in-filled image $I_{gt}$ may be encoded and input into a discriminator for calculating adversarial loss ($L_{adv}$). In some embodiments, the discriminator may utilize Spectral Normalization as described in Miyato et al., Spectral normalization for generative adversarial networks, arXiv:1802.05957, 2018. Spectral normalization may be faster and more stable than other normalizations by a simple formulation.

Inpainting loss may include four components: reconstruction loss, VGG style loss, perceptual loss, and MS-SSIM loss. Reconstruction loss completes occluded regions using /1-norm error. By comparing the generated image to the ground truth, the hole region loss and valid region loss may be computed, respectively. Additionally, perceptual loss and VGG style loss may be defined with a VGG-19 network pre-trained on ImageNet as described in Simonyan et al., Very deep convolutional networks for large-scale image recognition, arXiv:1409.1556, 2014. As the name indicates, perceptual loss measures the feature map distance between the generated image and the ground truth image. In some embodiments, perceptual loss measures the distance between $I_{out}$ 210 with $I_{style'}$ 122. The reverse mask of mask 124 ($M_r$) may be used to reflect $I_{style}$ more plausible in erased regions. Perceptual loss may be represented as:

$$L_{per} = \sum_i \sum_{j=1}^{\alpha} \left\| F_i\left(I_{out_j}\right) \cdot M_r - F_i\left(I_{style_j}\right) \cdot M_r \right\|_1 + \sum\nolimits_i \| F_i(I_{out}) \cdot M - F_i(I_{gt}) \cdot M \|_1 \tag{6}$$

where $F_i$ denotes the feature maps of the i'th layer of a VGG-19 network. A VGG style loss may also be used as described in Sajjadi et al., Enhancenet: Single image super-resolution through automated texture synthesis, ICCV, 2017. The VGG loss alleviates "checkerboard" artifacts caused by upsampling convolution layers 206. VGG loss also compares $I_{out}$ 210 with $I_{style'}$ 122 using $M_r$.

$$L_{style} = \sum_k \sum_{j=1}^{\alpha} \left\| G_k^F\left(I_{out_j}\right) \cdot M_r - G_k^F\left(I_{style_j}\right) \cdot M_r \right\|_1 + \sum\nolimits_k \left\| G_k^F(I_{out}) \cdot M - G_k^F(I_{gt}) \cdot M \right\|_1 \tag{7}$$

where $$G_k^F$$

is a gram matrix consisting of feature maps $F_k$. Additionally, another loss function may be used that utilizes MS-SSIM as described in Wang et al., Multiscale structural similarity for image quality assessment, ACSSC, 2003. MS-SSIM is an image quality comparison approach.

$$L_{MS-SSIM} = 1 \frac{1}{N} \sum_{l=1}^{N} MS-SSIM_n \tag{8}$$

Adversarial loss may be computed using WGAN-GP which optimizes the Wasserstein distance. Adversarial loss $L_G$ and $L_D$ may be represented as:

$$L_G = \mathbb{E}_{I_{masked}}\left[D\left(G\left(I_{masked}, I_{style'}, M\right)\right)\right] \tag{9}$$

$$L_D = \mathbb{E}_{I_{gt}}[D(I_{gt})] - \mathbb{E}_{I_{out}}[D(I_{out})] - \lambda_{gp}\mathbb{E}_{\hat{I}}\left[\left(\left\|\nabla_{\hat{I}} D(\hat{I})\right\|_2 - 1\right)^2\right] \tag{10}$$

The overall loss may be denoted as:

$$L_{all} = \lambda_{adv}L_{adv} + \lambda_{ssim}L_{MS-SSIM} + \lambda_{sty}L_{style} + L_{per} + \lambda_{hole}L_{hole} + \lambda_{valid}L_{valid}, \tag{11}$$

where, λ are hyper-parameters that control the terms' relative importance. In some embodiments, only a subset of these losses are included in the loss function during training. In some embodiments, additional loss functions are included during training.

Figure 4:
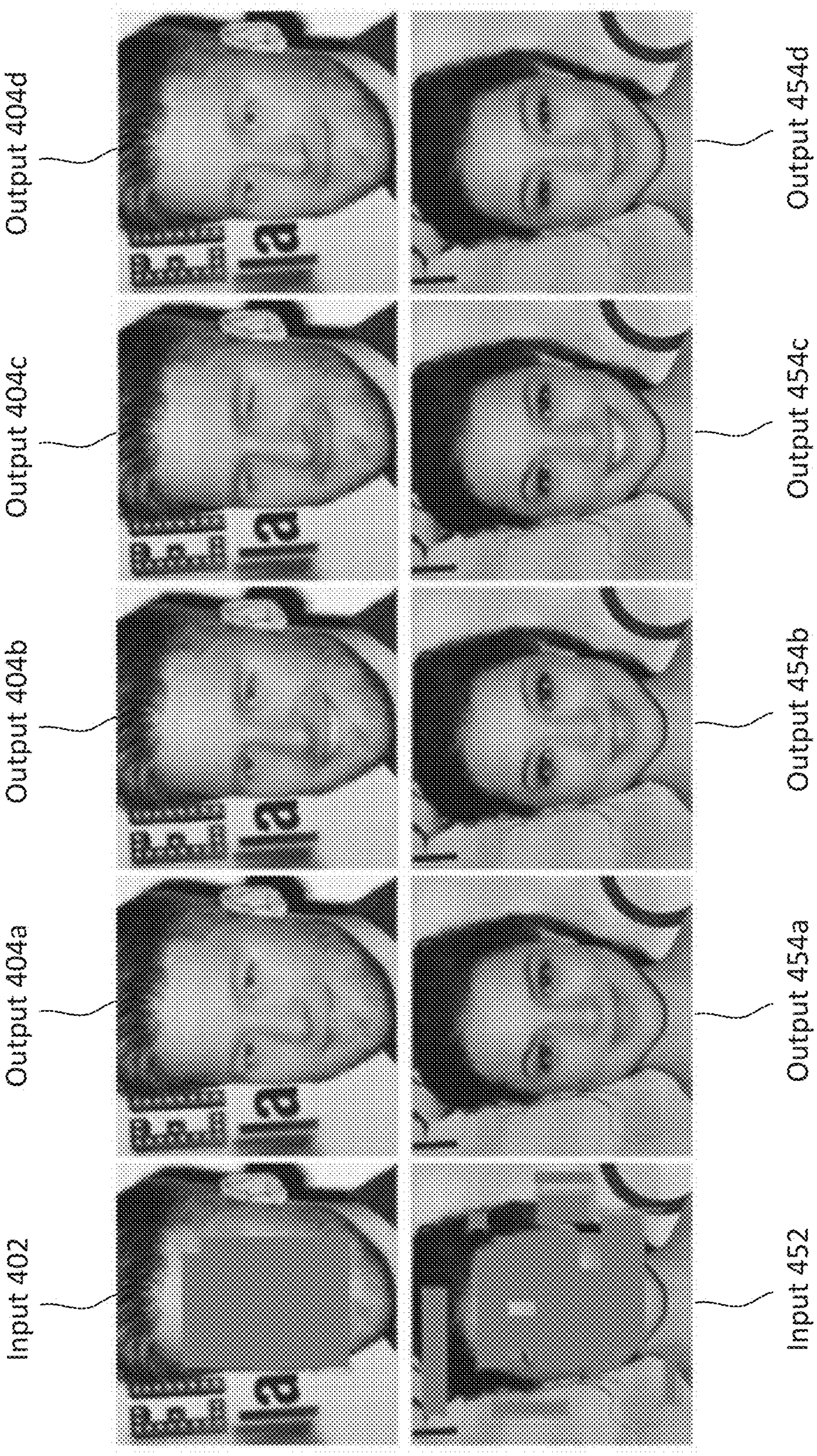
FIG. 4 illustrates exemplary generated inpainted images, according to some embodiments.

FIG. 4 illustrates exemplary generated inpainted images, according to some embodiments. Input 402 represents a masked input image. The masked input image 402 as input to the model described herein produces output images 404*a*-404*d*. Similarly, masked input image 452 was used as the input to the model described herein to produce output images 454*a*-454*d*. Note the diversity of generated images.

Figure 5:
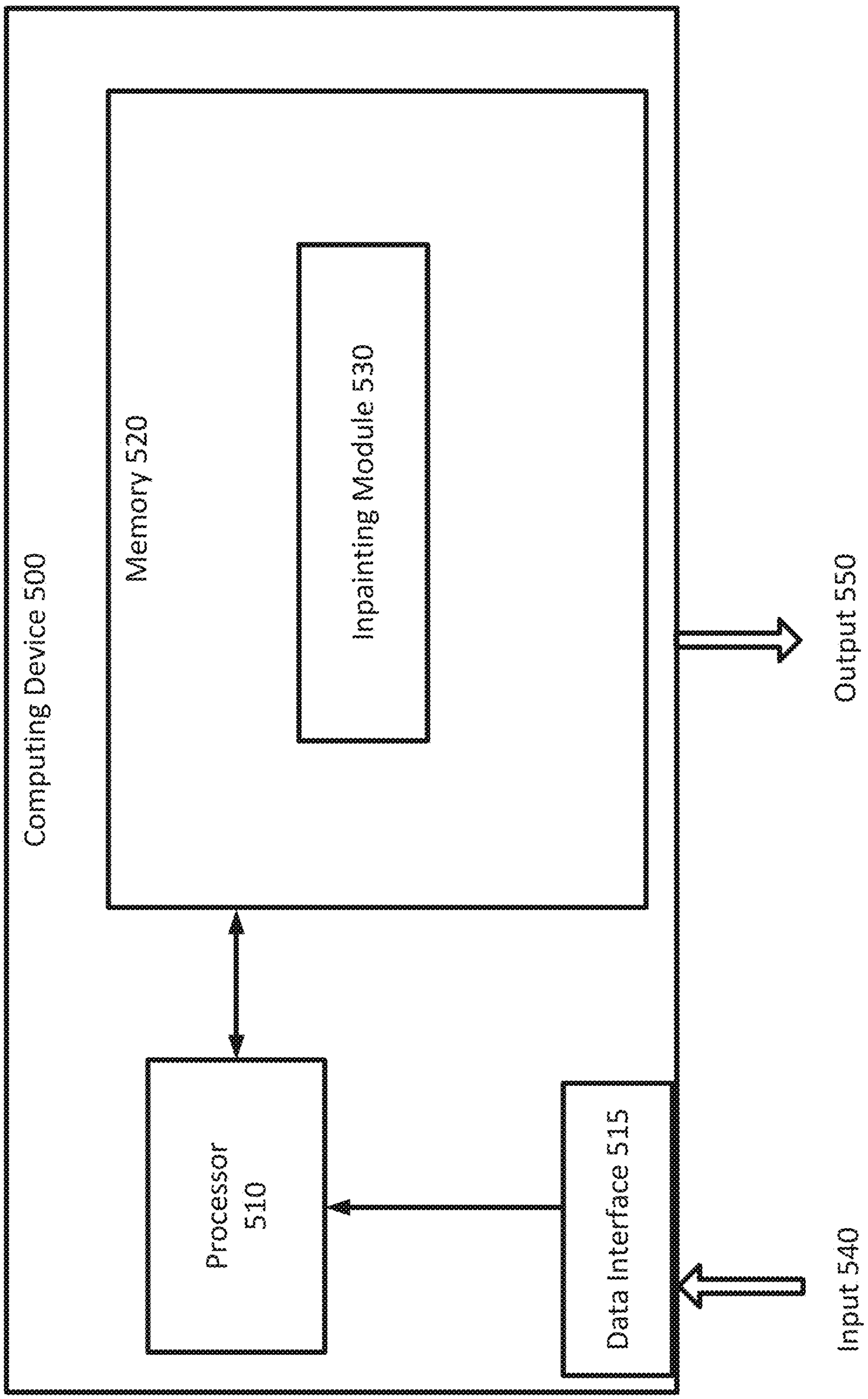
FIG. 5 is a simplified diagram illustrating a computing device implementing the framework described herein, according to some embodiments.

FIG. 5 is a simplified diagram illustrating a computing device 500 implementing the framework described herein, according to some embodiments. As shown in FIG. 5, computing device 500 includes a processor 510 coupled to memory 520. Operation of computing device 500 is controlled by processor 510. And although computing device 500 is shown with only one processor 510, it is understood that processor 510 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 500. Computing device 500 may be implemented as a stand-alone subsystem, as a board added to a computing device, and/or as a virtual machine.

Memory 520 may be used to store software executed by computing device 500 and/or one or more data structures used during operation of computing device 500. Memory 520 may include one or more types of transitory or non-transitory machine-readable media (e.g., computer-readable media). Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 510 and/or memory 520 may be arranged in any suitable physical arrangement. In some embodiments, processor 510 and/or memory 520 may be implemented on a same board, in a same package (e.g., system-in-package), on a same chip (e.g., system-on-chip), and/or the like. In some embodiments, processor 510 and/or memory 520 may include distributed, virtualized, and/or containerized computing resources. Consistent with such embodiments, processor 510 and/or memory 520 may be located in one or more data centers and/or cloud computing facilities.

In some examples, memory 520 may include non-transitory, tangible, machine readable media that includes executable code that when run by one or more processors (e.g., processor 510) may cause the one or more processors to perform the methods described in further detail herein. For example, as shown, memory 520 includes instructions for inpainting module 530 that may be used to implement and/or emulate the systems and models, and/or to implement any of the methods described further herein.

Inpainting module 530 may receive input 540 such as an input image, input mask, training data, model parameters, etc. and generate an output 550 such as an inpainted image, trained model parameters, etc. For example, inpainting module 530 may be configured to perform the training and/or inference associated with image inpainting as described herein, for example in FIGS. 1-3.

The data interface 515 may comprise a communication interface, a user interface (such as a voice input interface, a graphical user interface, and/or the like). For example, the computing device 500 may receive the input 540 from a networked device via a communication interface. Or the computing device 500 may receive the input 540, such as a masked input image, from a user via the user interface.

Some examples of computing devices, such as computing device 500 may include non-transitory, tangible, machine readable media that include executable code that when run by one or more processors (e.g., processor 510) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 6:
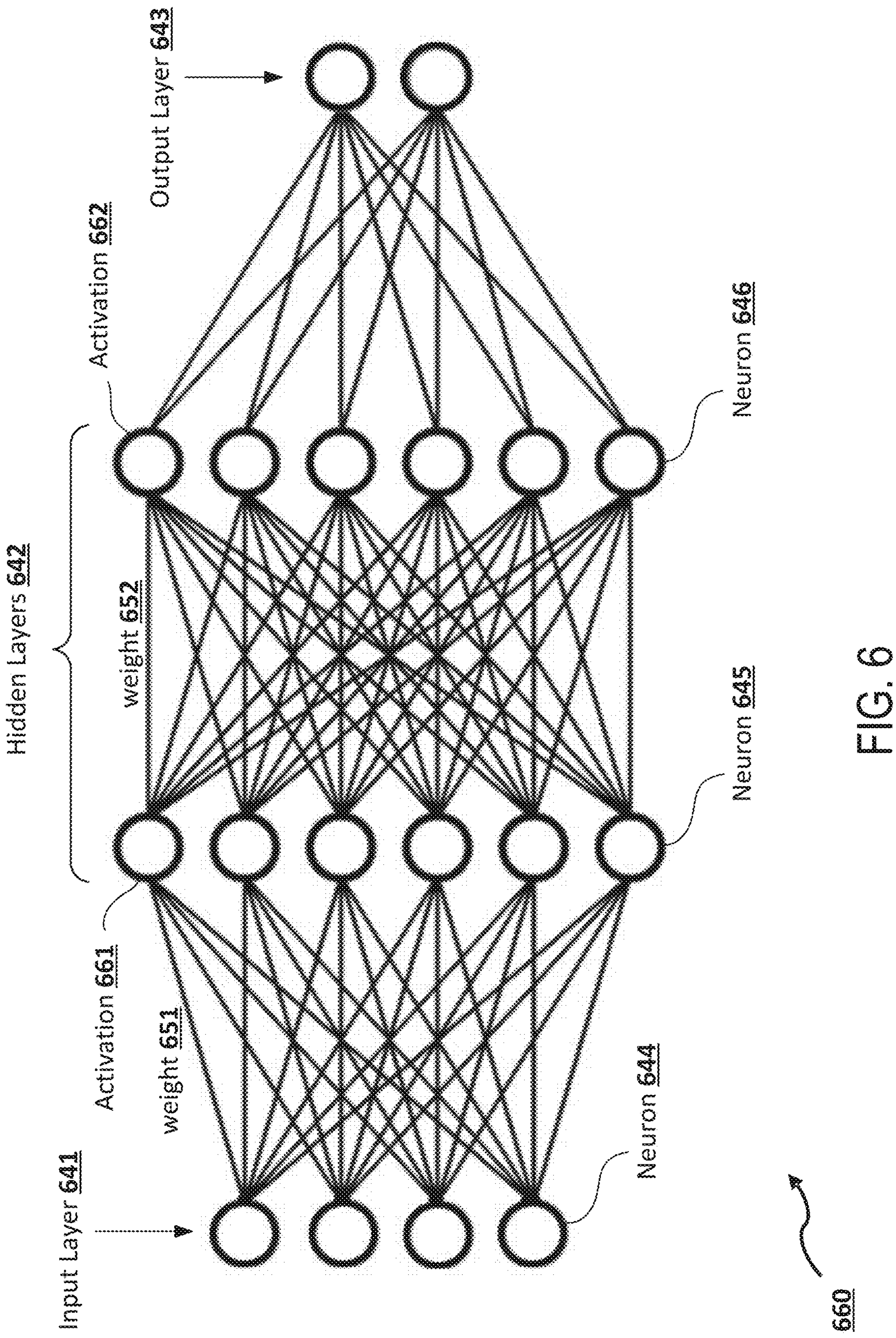
FIG. 6 is a simplified diagram illustrating a neural network structure, according to some embodiments.

FIG. 6 is a simplified diagram illustrating the neural network structure, according to some embodiments. In some embodiments, the inpainting module 530 may be implemented at least partially via an artificial neural network structure shown in FIG. 6. The neural network comprises a computing system that is built on a collection of connected units or nodes, referred to as neurons (e.g., 644, 645, 646). Neurons are often connected by edges, and an adjustable weight (e.g., 651, 652) is often associated with the edge. The neurons are often aggregated into layers such that different layers may perform different transformations on the respective input and output transformed input data onto the next layer.

For example, the neural network architecture may comprise an input layer 641, one or more hidden layers 642 and an output layer 643. Each layer may comprise a plurality of neurons, and neurons between layers are interconnected according to a specific topology of the neural network topology. The input layer 641 receives the input data such as training data, user input data, vectors representing latent features, etc. The number of nodes (neurons) in the input layer 641 may be determined by the dimensionality of the input data (e.g., the length of a vector of the input). Each node in the input layer represents a feature or attribute of the input.

The hidden layers 642 are intermediate layers between the input and output layers of a neural network. It is noted that two hidden layers 642 are shown in FIG. 6 for illustrative purpose only, and any number of hidden layers may be utilized in a neural network structure. Hidden layers 642 may extract and transform the input data through a series of weighted computations and activation functions.

For example, as discussed in FIG. 5, the inpainting module 530 receives an input 540 and transforms the input into an output 550. To perform the transformation, a neural network such as the one illustrated in FIG. 6 may be utilized to perform, at least in part, the transformation. Each neuron receives input signals, performs a weighted sum of the inputs according to weights assigned to each connection (e.g., 651, 652), and then applies an activation function (e.g., 661, 662, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 641 is transformed into rather different values indicative data characteristics corresponding to a task that the neural network structure has been designed to perform.

The output layer 643 is the final layer of the neural network structure. It produces the network's output or prediction based on the computations performed in the preceding layers (e.g., 641, 642). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the inpainting module 530 may comprise the transformative neural network structure of layers of neurons, and weights and activation functions describing the non-linear transformation at each neuron. Such a neural network structure is often implemented on one or more hardware processors 510, such as a graphics processing unit (GPU).

In one embodiment, the inpainting module 530 may be implemented by hardware, software and/or a combination thereof. For example, the inpainting module 530 may comprise a specific neural network structure implemented and run on various hardware platforms 660, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware 660 used to implement the neural network structure is specifically configured based on factors such as the complexity of the neural network, the scale of the tasks (e.g., training time, input data scale, size of training dataset, etc.), and the desired performance.

In one embodiment, the neural network based inpainting module 530 may be trained by iteratively updating the underlying parameters (e.g., weights 651, 652, etc., bias parameters and/or coefficients in the activation functions 661, 662 associated with neurons) of the neural network based on a loss function. For example, during forward propagation, the training data such as masked images paired with ground truth inpainted images are fed into the neural network. The data flows through the network's layers 641, 642, with each layer performing computations based on its weights, biases, and activation functions until the output layer 643 produces the network's output 650. In some embodiments, output layer 643 produces an intermediate output on which the network's output 650 is based.

The output generated by the output layer 643 is compared to the expected output (e.g., a "ground-truth" such as the corresponding ground truth inpainted image from the training data, to compute a loss function that measures the discrepancy between the predicted output and the expected output. Given a loss function, the negative gradient of the loss function is computed with respect to each weight of each layer individually. Such negative gradient is computed one layer at a time, iteratively backward from the last layer 643 to the input layer 641 of the neural network. These gradients quantify the sensitivity of the network's output to changes in the parameters. The chain rule of calculus is applied to efficiently calculate these gradients by propagating the gradients backward from the output layer 643 to the input layer 641.

Parameters of the neural network are updated backwardly from the last layer to the input layer (backpropagating) based on the computed negative gradient using an optimization algorithm to minimize the loss. The backpropagation from the last layer 643 to the input layer 641 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as images of unseen faces with unseen masks.

Neural network parameters may be trained over multiple stages. For example, initial training (e.g., pre-training) may be performed on one set of training data, and then an additional training stage (e.g., fine-tuning) may be performed using a different set of training data. In some embodiments, all or a portion of parameters of one or more neural-network model being used together may be frozen, such that the "frozen" parameters are not updated during that training phase. This may allow, for example, a smaller subset of the parameters to be trained without the computing cost of updating all of the parameters.

The neural network illustrated in FIG. 6 is exemplary. For example, different neural network structures may be utilized, and additional neural-network based or non-neural-network based component may be used in conjunction as part of module 530. For example, a text input may first be embedded by an embedding model, a self-attention layer, etc. into a feature vector. The feature vector may be used as the input to input layer 641. Output from output layer 643 may be output directly to a user or may undergo further processing. For example, the output from output layer 643 may be decoded by a neural network based decoder. The neural network illustrated in FIG. 600 and described herein is representative and demonstrates a physical implementation for performing the methods described herein.

Through the training process, the neural network is "updated" into a trained neural network with updated parameters such as weights and biases. The trained neural network may be used in inference to perform the tasks described herein, for example those performed by module 530. The trained neural network thus improves neural network technology in image inpainting.

Figure 7:
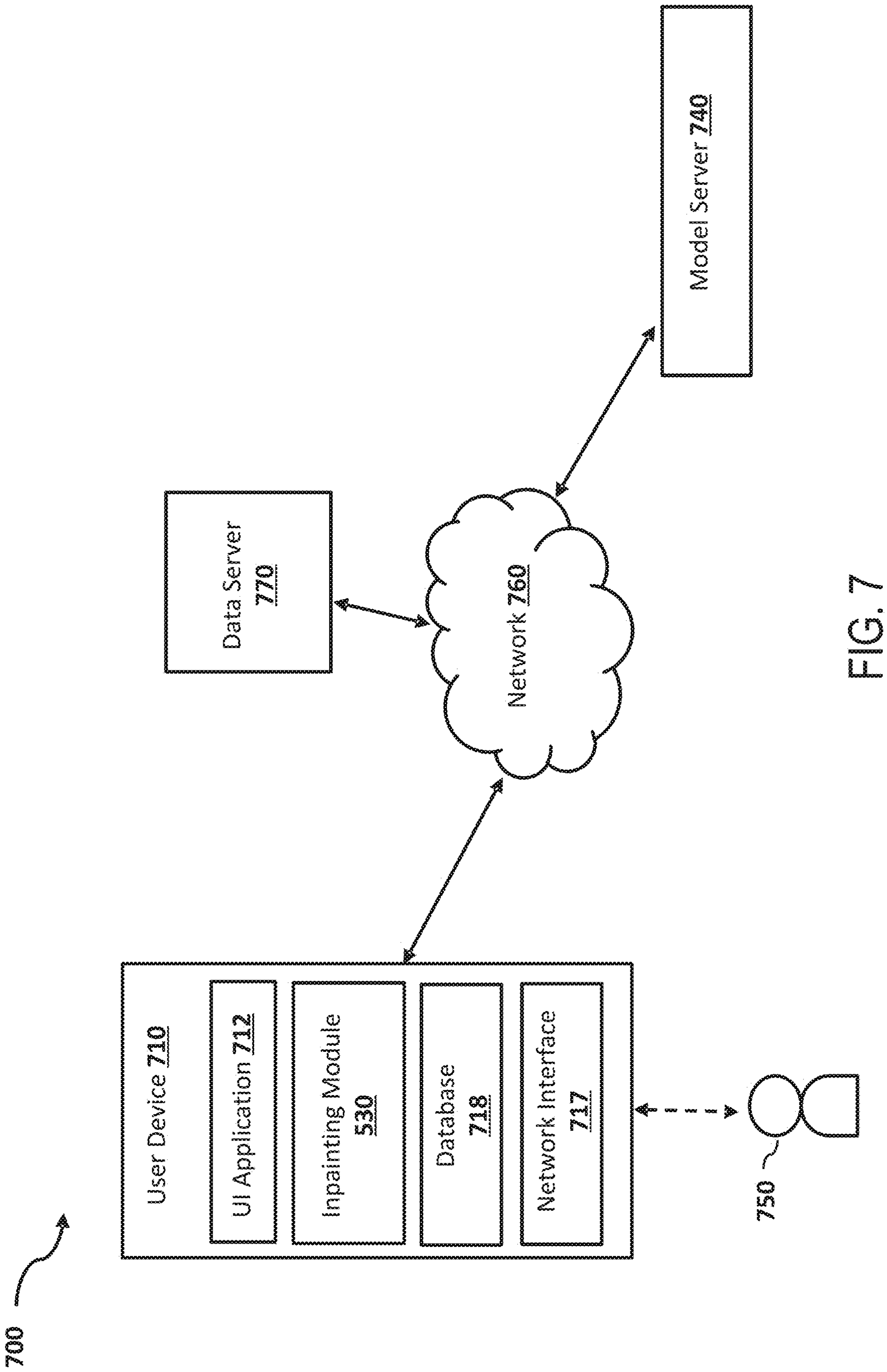
FIG. 7 is a simplified block diagram of a networked system suitable for implementing the framework described herein.

FIG. 7 is a simplified block diagram of a networked system 700 suitable for implementing the framework described herein. In one embodiment, system 700 includes the user device 710 (e.g., computing device 500) which may be operated by user 750, data server 770, model server 740, and other forms of devices, servers, and/or software components that operate to perform various methodologies in accordance with the described embodiments. Exemplary devices and servers may include device, stand-alone, and enterprise-class servers which may be similar to the computing device 500 described in FIG. 5, operating an OS such as a MICROSOFT® OS, a UNIX® OS, a LINUX® OS, a real-time operation system (RTOS), or other suitable device and/or server-based OS. It can be appreciated that the devices and/or servers illustrated in FIG. 7 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities. In some embodiments, user device 710 is used in training neural network based models. In some embodiments, user device 710 is used in performing inference tasks using pre-trained neural network based models (locally or on a model server such as model server 740).

User device 710, data server 770, and model server 740 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 700, and/or accessible over network 760. User device 710, data server 770, and/or model server 740 may be a computing device 500 (or similar) as described herein.

In some embodiments, all or a subset of the actions described herein may be performed solely by user device 710. In some embodiments, all or a subset of the actions described herein may be performed in a distributed fashion by various network devices, for example as described herein.

User device 710 may be implemented as a communication device that may utilize appropriate hardware and software configured for wired and/or wireless communication with data server 770 and/or the model server 740. For example, in one embodiment, user device 710 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 710 of FIG. 7 contains a user interface (UI) application 712, and inpainting module 530, which may correspond to executable processes, procedures, and/or applications with associated hardware. For example, the user device 710 may allow a user to generated a number of different versions of an inpainted image based on a single masked input image. In other embodiments, user device 710 may include additional or different modules having specialized hardware and/or software as required.

In various embodiments, user device 710 includes other applications as may be desired in particular embodiments to provide features to user device 710. For example, other applications may include security applications for implementing client-side security features, programmatic client applications for interfacing with appropriate application programming interfaces (APIs) over network 760, or other types of applications. Other applications may also include communication applications, such as email, texting, voice, social networking, and IM applications that allow a user to send and receive emails, calls, texts, and other notifications through network 760.

Network 760 may be a network which is internal to an organization, such that information may be contained within secure boundaries. In some embodiments, network 760 may be a wide area network such as the internet. In some embodiments, network 760 may be comprised of direct physical connections between the devices. In some embodiments, network 760 may represent communication between different portions of a single device (e.g., a communication bus on a motherboard of a computation device).

Network 760 may be implemented as a single network or a combination of multiple networks. For example, in various embodiments, network 760 may include the Internet or one or more intranets, landline networks, wireless networks, and/or other appropriate types of networks. Thus, network 760 may correspond to small scale communication networks, such as a private or local area network, or a larger scale network, such as a wide area network or the Internet, accessible by the various components of system 700.

User device 710 may further include database 718 stored in a transitory and/or non-transitory memory of user device 710, which may store various applications and data (e.g., model parameters) and be utilized during execution of various modules of user device 710. Database 718 may store images, model parameters, etc. In some embodiments, database 718 may be local to user device 710. However, in other embodiments, database 718 may be external to user device 710 and accessible by user device 710, including cloud storage systems and/or databases that are accessible over network 760 (e.g., on data server 770).

User device 710 may include at least one network interface component 717 adapted to communicate with data server 770 and/or model server 740. In various embodiments, network interface component 717 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data Server 770 may perform some of the functions described herein. For example, data server 770 may store a training dataset including masked images and ground truth inpainted images, masks, etc. Data server 770 may provide data to user device 710 and/or model server 740. For example, training data may be stored on data server 770 and that training data may be retrieved by model server 740 while training a model stored on model server 740.

Model server 740 may be a server that hosts models described herein. Model server 740 may provide an interface via network 760 such that user device 710 may perform functions relating to the models as described herein (e.g., diverse image inpainting). Model server 740 may communicate outputs of the models to user device 710 via network 760. User device 710 may display model outputs, or information based on model outputs, via a user interface to user 750.

Figure 8:
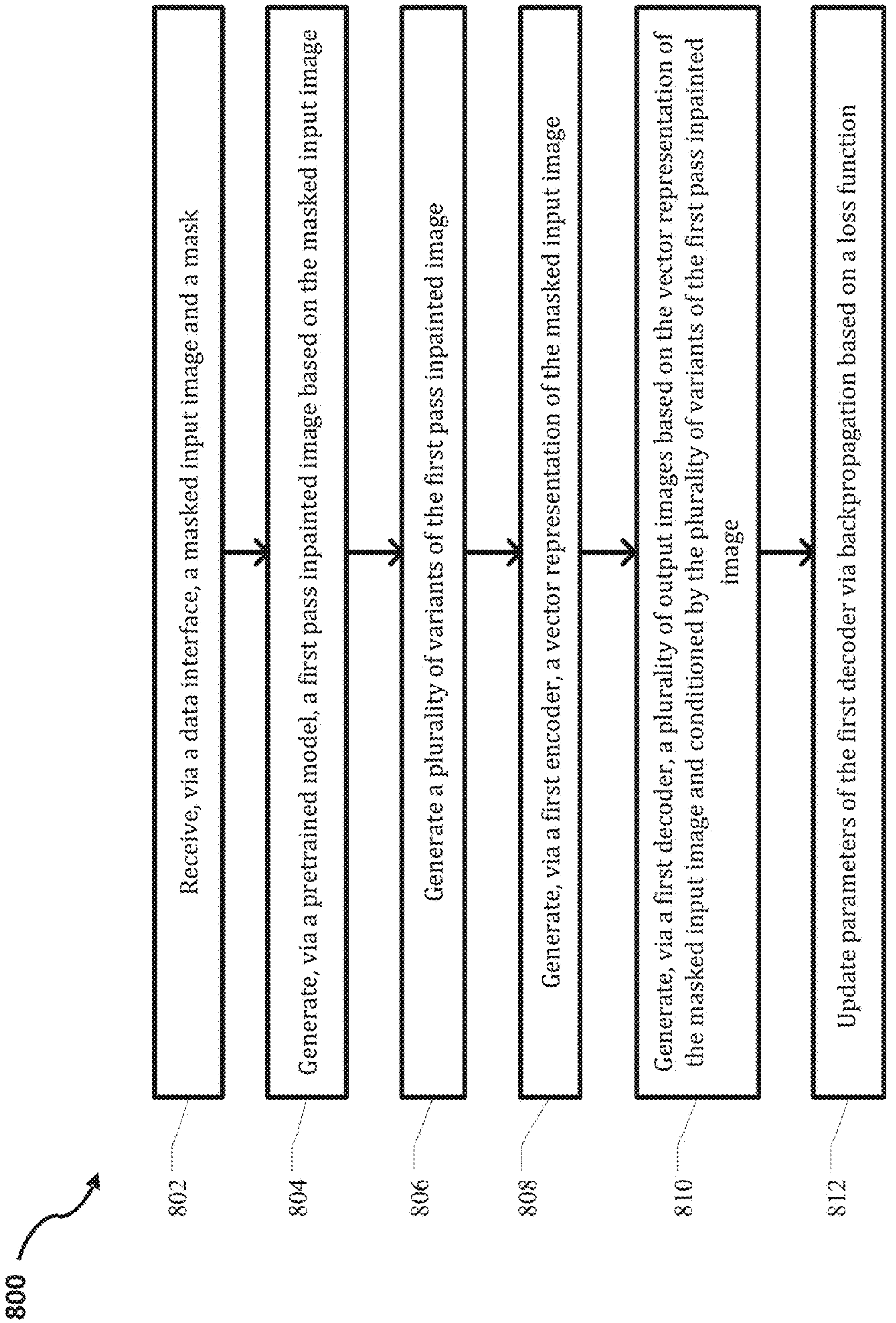
FIG. 8 is an example logic flow diagram, according to some embodiments.

FIG. 8 is an example logic flow diagram, according to some embodiments described herein. One or more of the processes of method 800 may be implemented, at least in part, in the form of executable code stored on non-transitory, tangible, machine-readable media that when run by one or more processors may cause the one or more processors to perform one or more of the processes (e.g., computing device 500). In some embodiments, method 800 corresponds to the operation of the inpainting module 530 that performs diverse image inpainting.

As illustrated, the method 800 includes a number of enumerated steps, but aspects of the method 800 may include additional steps before, after, and in between the enumerated steps. In some aspects, one or more of the enumerated steps may be omitted or performed in a different order.

At step 802, a system (e.g., computing device 500, user device 710, model server 740, device 900, or device 915) receives, via a data interface (e.g., data interface 515 or network interface 717), a masked input image (e.g., image 102) and a mask (e.g., mask 124).

At step 804, the system generates, via a pretrained model (e.g., blurry inpainter 104), a first pass inpainted image (e.g., coarse image 106) based on the masked input image. In some embodiments, the pretrained model is configured to generate a blurry first pass inpainted image. The blurriness of the image may enhance the diversity of the generated images.

At step 806, the system generates a plurality of variants of the first pass inpainted image (e.g., images 120). In some embodiments, generating the plurality of variants of the first pass inpainted image 106 includes generating, via an encoder (e.g., encoder 108), a vector representation of the first pass inpainted image (e.g., vector representation 110). The generating the plurality of variants may further include generating a plurality of modified versions of the vector representation of the first pass inpainted image (e.g., variants 114). The generating the plurality of variants may further include generating, via a decoder (e.g., decoder 116), the plurality of variants of the first pass inpainted image based on the plurality of modified versions of the vector representation of the first pass inpainted image. In some embodiments, generating the plurality of modified versions of the vector representation may include determining a plurality of principal components (e.g., via PCA 112) that span dominant changes associated with the vector representation of the first pass inpainted image. Generating the plurality of modified versions of the vector representation may further include generating the plurality of modified versions of the vector representation of the first pass inpainted image by adding vector offsets based on the plurality of principal components to the vector representation of the first pass inpainted image.

At step 808, the system generates, via an encoder (e.g., encoder 202), a vector representation of the masked input image.

At step 810, the system generates, via a decoder (e.g., decoder 204), a plurality of output images (e.g., output images 210) based on the vector representation of the masked input image and conditioned by the plurality of variants of the first pass inpainted image. In some embodiments, generating the plurality of output images is further conditioned by the mask. In some embodiments, the first decoder includes a plurality of residual blocks (e.g., SPARN residual blocks 208*a*-208*c*). In some embodiments, each residual block of the plurality of residual blocks includes one or more region normalization layers (e.g., SPARN layers 306*a*-306*c*). In some embodiments, the one or more region normalization layers computes respective mean and variance vectors for different regions defined by the mask, wherein the normalization performed by the region normalization layers is based on the respective mean and variance vectors. In some embodiments, each residual block of the plurality of residual blocks includes one or more up-sampling layers (e.g., up-sampling layers 206*a*-206*d*).

At step 812, the system updates parameters of the decoder that generates the output images via backpropagation based on a loss function. In some embodiments, the loss function includes a comparison of at least one of the plurality of output images to at least one ground-truth image. In some embodiments, the loss function includes at least one of an adversarial loss, an SSIM loss (e.g., as described in equation (8)), a style loss (e.g., as described in equation (7)), or a perceptual loss (e.g., as described in equation (6)).

Figure 9B:
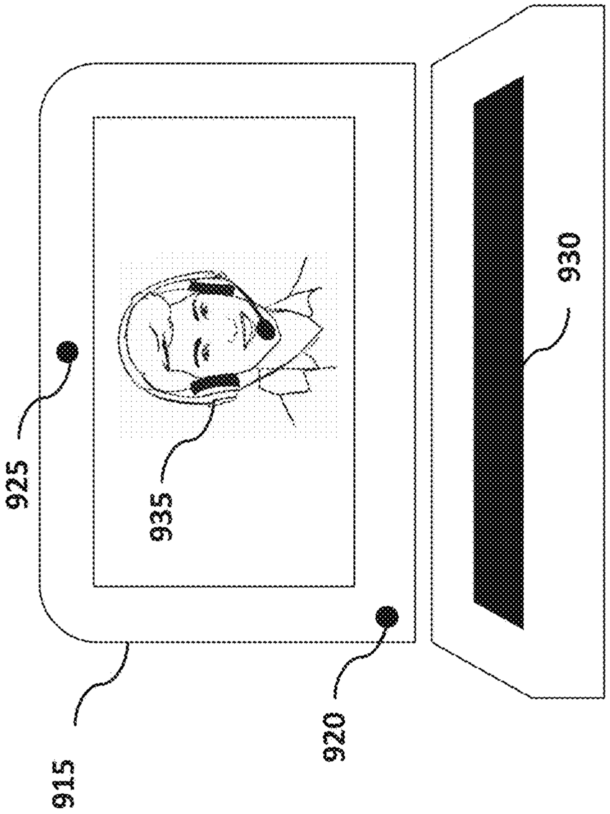
FIGS. 9A-9B are exemplary devices with digital avatar interfaces, according to some embodiments.
Figure 9A:
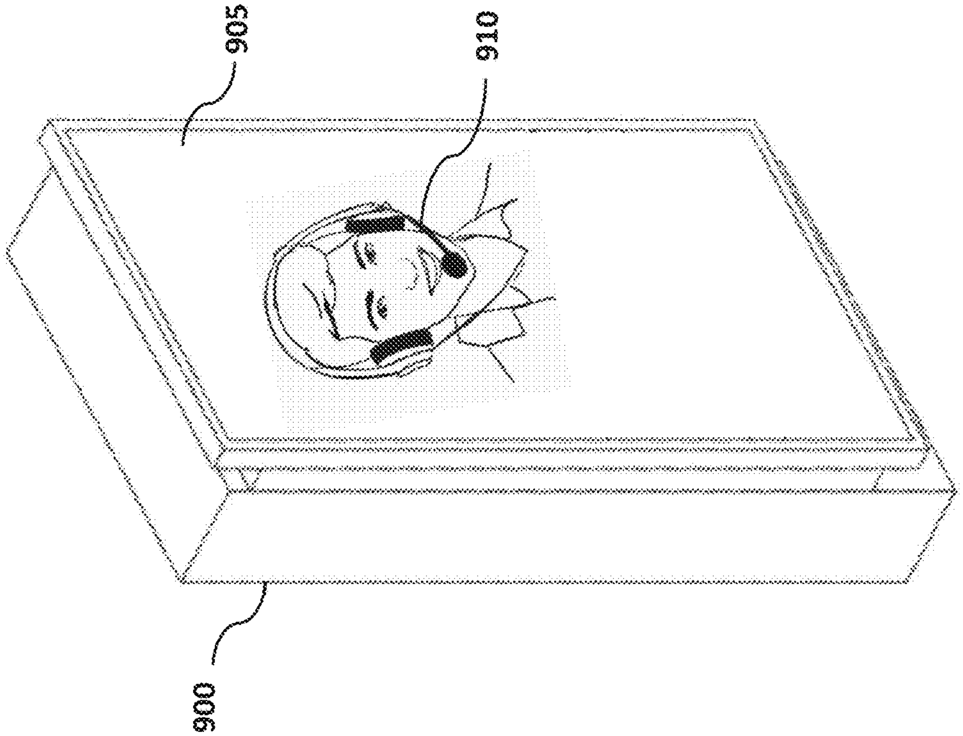

FIG. 9A is an exemplary device 900 with a digital avatar interface, according to some embodiments. Device 900 may be, for example, a kiosk that is available for use at a store, a library, a transit station, etc. Device 900 may display a digital avatar 910 on display 905. In some embodiments, a user may interact with the digital avatar 910 as they would a person, using voice and non-verbal gestures. Digital avatar 910 may interact with a user via digitally synthesized gestures, digitally synthesized voice, etc.

Device 900 may include one or more microphones, and one or more image-capture devices (not shown) for user interaction. Device 900 may be connected to a network (e.g., network 760). Digital Avatar 910 may be controlled via local software and/or through software that is at a central server accessed via a network. For example, an AI model may be used to control the behavior of digital avatar 910, and that AI model may be run remotely. In some embodiments, device 900 may be configured to perform functions described herein (e.g., via digital avatar 910). For example, device 900 may perform one or more of the functions as described with reference to computing device 500 or user device 710.

FIG. 9B is an exemplary device 915 with a digital avatar interface, according to some embodiments. Device 915 may be, for example, a personal laptop computer or other computing device. Device 915 may have an application that displays a digital avatar 935 with functionality similar to device 900. For example, device 915 may include a microphone 920 and image capturing device 925, which may be used to interact with digital avatar 935. In addition, device 915 may have other input devices such as a keyboard 930 for entering text.

Digital avatar 935 may interact with a user via digitally synthesized gestures, digitally synthesized voice, etc. In some embodiments, device 915 may be configured to perform functions described herein (e.g., via digital avatar 935). For example, device 915 may perform one or more of the functions as described with reference to computing device 500 or user device 710.

FIGS. 10A-13 provide charts illustrating exemplary performance of different embodiments described herein. For the experiments, the hyper-parameters $\lambda_{adv}$, $\lambda_{ssim}$, $\lambda_{sty}$, $\lambda_{hole}$, and $\lambda_{valid}$ were set to 0.5, 120, 3, and 0.5 respectively. Experiments were performed for all models using CelebA-HQ dataset, a dataset with 30,000 high quality images of celebrity faces. The CelebA-HQ dataset was split them into two groups: 28,000 selected for training and 2000 for testing. 256×256 images were used with irregular holes to train and evaluate the proposed methods. Additional irregular masks were used in training by the additional inclusion of the Quickdraw irregular mask dataset with 85×85 square holes in random positions as described in Iskakov., Semi-parametric image inpainting, arXiv:1807.02855, 2018. By combining square holes with the Quickdraw dataset, the model becomes more robust to irregular holes.

Baseline models utilized in the experiments include PIC as described in Zheng et al., Pluralistic image completion, CVPR, 2019; LBAM as described in Xie et al., Image inpainting with learnable bidirectional attention maps, ICCV, 2019; EC as described in Nazeri et al., Edgeconnect: Structure guided image inpainting using edge prediction, ICCVW, 2019; and MLGN as described in Liu et al., Facial image inpainting using multi-level generative network.

Metrics used in the charts include SSIM as described in Wang et al., Image quality assessment: From error measurement to structural similarity, 19 Trans. Image Processing, col. 13, 2004; LPIPS as described in Zhang et al., The unreasonable effectiveness of deep features as a perceptual metric, CVPR, 2018; and FID as described in Heusel et al., GANs trained by a two time-scale update rule converge to a local Nash equilibrium, NeurIPS, 2017. Embodiments of the methods described herein are indicated in the charts as "ours".

Figure 10A:
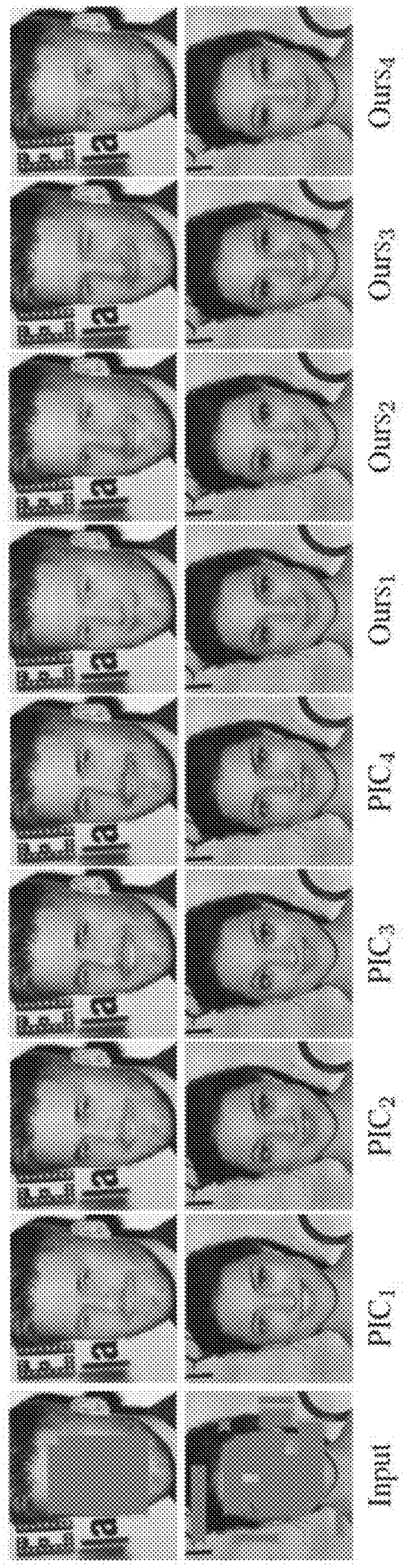
Figure 10B:
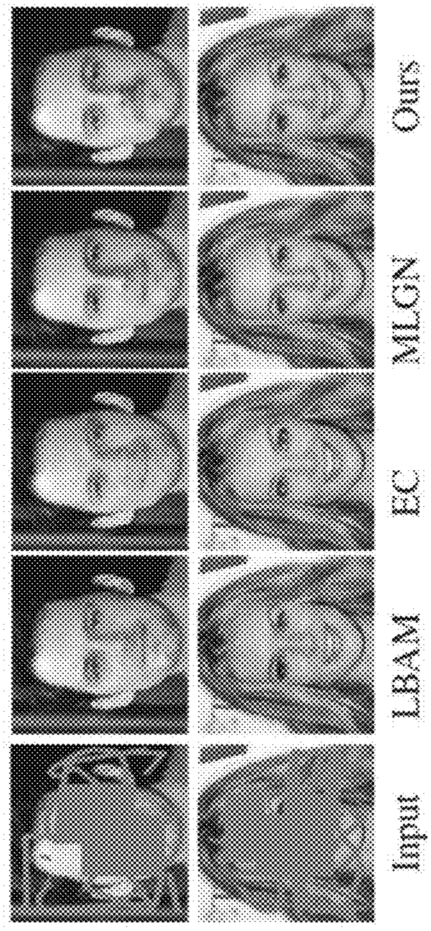

FIGS. 10A-10B illustrate comparisons of inpainting results by embodiments described herein as compared to baseline models. FIG. 10A compares diverse images generated by PIC and by an embodiment of the framework described herein (ours). Compared to the PIC, the method described herein accomplishes more diverse and pluralistic instances, as illustrated.

FIG. 10B illustrates a comparison of the image inpainting quality of images generated by the framework described herein against three alternative methods. As illustrated, the framework described herein generates superior images to all the others in the aspect of image quality and plausibility.

FIG. 11 illustrates a quantitative comparison on the CelebA-HQ dataset. In each row, the best results are shown in bold text. Comparisons were made to three existing alternative methods, using different types and sizes of masks. As shown in FIG. 11, the method described herein "ours" outperforms on three metrics SSIM, LPIPS, and FID to existing methods that specialize in only image inpainting tasks.

FIG. 12 illustrates a quantitative comparison of diversity on the CelebA-HQ dataset. For the diversity comparison, higher LPIPS is better. The method described herein achieves a relatively higher diversity score than another method. The diversity score is calculated between 4K pairs synthesized from a sampling of 1K images.

FIG. 13 illustrates a quantitative comparison of an ablation study on the CelebA-HQ dataset. This experiment was performed using the Quickdraw irregular mask. To justify the effectiveness of the SPARN decoder 204, the ablation study was conducted as follows: 1) Using SPADE decoder as described in Park et al., Semantic image synthesis with spatially-adaptive normalization, CVPR, 2019; 2) replacing all the region normalization with batch normalization (w/o RN). As shown in FIG. 13, each of the proposed submodules improves the performance of the overall architecture.

The devices described above may be implemented by one or more hardware components, software components, and/or a combination of the hardware components and the software components. For example, the device and the components described in the exemplary embodiments may be implemented, for example, using one or more general purpose computers or special purpose computers such as a processor, a controller, an arithmetic logic unit (ALU), a digital signal processor, a microcomputer, a field programmable gate array (FPGA), a programmable logic unit (PLU), a microprocessor, or any other device which executes or responds instructions. The processing device may perform an operating system (OS) and one or more software applications which are performed on the operating system. Further, the processing device may access, store, manipulate, process, and generate data in response to the execution of the software. For ease of understanding, it may be described that a single processing device is used, but those skilled in the art may understand that the processing device includes a plurality of processing elements and/or a plurality of types of the processing element. For example, the processing device may include a plurality of processors or include one processor and one controller. Further, another processing configuration such as a parallel processor may be implemented.

The software may include a computer program, a code, an instruction, or a combination of one or more of them, which configure the processing device to be operated as desired or independently or collectively command the processing device. The software and/or data may be interpreted by a processing device or embodied in any tangible machines, components, physical devices, computer storage media, or devices to provide an instruction or data to the processing device. The software may be distributed on a computer system connected through a network to be stored or executed in a distributed manner The software and data may be stored in one or more computer readable recording media.

The method according to the exemplary embodiment may be implemented as a program instruction which may be executed by various computers to be recorded in a computer readable medium. At this time, the medium may continuously store a computer executable program or temporarily store it to execute or download the program. Further, the medium may be various recording means or storage means to which a single or a plurality of hardware is coupled and the medium is not limited to a medium which is directly connected to any computer system, but may be distributed on the network. Examples of the medium may include magnetic media such as hard disk, floppy disks and magnetic tapes, optical media such as CD-ROMs and DVDs, magneto-optical media such as optical disks, and ROMs, RAMS, and flash memories to be specifically configured to store program instructions. Further, an example of another medium may include a recording medium or a storage medium which is managed by an app store which distributes application, a site and servers which supply or distribute various software, or the like.

Although the exemplary embodiments have been described above by a limited embodiment and the drawings, various modifications and changes can be made from the above description by those skilled in the art. For example, even when the above-described techniques are performed by different order from the described method and/or components such as systems, structures, devices, or circuits described above are coupled or combined in a different manner from the described method or replaced or substituted with other components or equivalents, the appropriate results can be achieved. It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A method of image inpainting, the method comprising:
- receiving, via a data interface, a masked input image and a mask;
- generating, via a pretrained model, a first pass inpainted image based on the masked input image;
- generating a plurality of variants of the first pass inpainted image;, wherein the generating the plurality of variants of the first pass inpainted image includes:
- generating, via a second encoder, a vector representation of the first pass inpainted image;
- generating a plurality of modified versions of the vector representation of the first pass inpainted image; and
- generating, via a second decoder, the plurality of variants of the first pass inpainted image based on the plurality of modified versions of the vector representation of the first pass inpainted image;
- generating, via a first encoder, a vector representation of the masked input image; and
- generating, via a first decoder, a plurality of output images based on the vector representation of the masked input image and conditioned by the plurality of variants of the first pass inpainted image.

2. The method of claim 1, wherein the generating the plurality of modified versions of the vector representation includes:
- determining a plurality of principal components that span dominant changes associated with the vector representation of the first pass inpainted image; and
- generating the plurality of modified versions of the vector representation of the first pass inpainted image by adding vector offsets based on the plurality of principal components to the vector representation of the first pass inpainted image.

3. The method of claim 1, wherein the generating the plurality of output images is further conditioned by the mask.

4. The method of claim 1, wherein the first decoder includes a plurality of residual blocks.

5. The method of claim 4, wherein each residual block of the plurality of residual blocks includes one or more region normalization layers.

6. The method of claim 5, wherein the one or more region normalization layers computes respective mean and variance vectors for different regions defined by the mask, wherein the normalization performed by the region normalization layers is based on the respective mean and variance vectors.

7. The method of claim 5, wherein each residual block of the plurality of residual blocks includes one or more upsampling layers.

8. The method of claim 1, further comprising:

updating parameters of the first decoder via backpropagation based on a loss function, wherein the loss function includes a comparison of at least one of the plurality of output images to at least one ground-truth image.

9. A system for image inpainting, the system comprising:

a memory that stores a plurality of processor executable instructions;

a data interface that receives a masked input image and a mask; and one or more hardware processors that read and execute the plurality of processor-executable instructions from the memory to perform operations comprising:

generating, via a pretrained model, a first pass inpainted image based on the masked input image;

generating a plurality of variants of the first pass inpainted image, wherein the generating the plurality of variants of the first pass inpainted image includes:

generating, via a second encoder, a vector representation of the first pass inpainted image;

generating a plurality of modified versions of the vector representation of the first pass inpainted image; and generating, via a second decoder, the plurality of variants of the first pass inpainted image based on the plurality of modified versions of the vector representation of the first pass inpainted image;

generating, via a first encoder, a vector representation of the masked input image; and generating, via a first decoder, a plurality of output images based on the vector representation of the masked input image and conditioned by the plurality of variants of the first pass inpainted image.

10. The system of claim 9, wherein the generating the plurality of modified versions of the vector representation includes:

determining a plurality of principal components that span dominant changes associated with the vector representation of the first pass inpainted image; and generating the plurality of modified versions of the vector representation of the first pass inpainted image by adding vector offsets based on the plurality of principal components to the vector representation of the first pass inpainted image.

11. The system of claim 9, wherein the generating the plurality of output images is further conditioned by the mask.

12. The system of claim 9, wherein the first decoder includes a plurality of residual blocks.

13. The system of claim 12, wherein each residual block of the plurality of residual blocks includes one or more region normalization layers.

14. The system of claim 13, wherein the one or more region normalization layers computes respective mean and variance vectors for different regions defined by the mask, wherein the normalization performed by the region normalization layers is based on the respective mean and variance vectors.

15. The system of claim 13, wherein each residual block of the plurality of residual blocks includes one or more up-sampling layers.

16. The system of claim 9, the operations further comprising:

updating parameters of the first decoder via backpropagation based on a loss function, wherein the loss function includes a comparison of at least one of the plurality of output images to at least one ground-truth image.

17. A non-transitory machine-readable medium comprising a plurality of machine-executable instructions which, when executed by one or more processors, are adapted to cause the one or more processors to perform operations comprising:

receiving, via a data interface, a masked input image and a mask;

generating, via a pretrained model, a first pass inpainted image based on the masked input image;

generating a plurality of variants of the first pass inpainted image;, wherein the generating the plurality of variants of the first pass inpainted image includes:

generating, via a second encoder, a vector representation of the first pass inpainted image;

generating a plurality of modified versions of the vector representation of the first pass inpainted image; and generating, via a second decoder, the plurality of variants of the first pass inpainted image based on the plurality of modified versions of the vector representation of the first pass inpainted image;

generating, via a first encoder, a vector representation of the masked input image; and generating, via a first decoder, a plurality of output images based on the vector representation of the masked input image and conditioned by the plurality of variants of the first pass inpainted image.

* * * * *